United States Patent
Seavey et al.

(10) Patent No.: US 9,637,593 B2
(45) Date of Patent: May 2, 2017

(54) SINGLE COLUMN STRIPPING AND DRYING PROCESS

(71) Applicants: Kevin C. Seavey, Clute, TX (US); Walter C. Moore, Lake Jackson, TX (US); John W. Weston, Sugarland, TX (US); Carlos M. Villa, Lake Jackson, TX (US)

(72) Inventors: Kevin C. Seavey, Clute, TX (US); Walter C. Moore, Lake Jackson, TX (US); John W. Weston, Sugarland, TX (US); Carlos M. Villa, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/046,357

(22) Filed: Feb. 17, 2016

(65) Prior Publication Data
US 2016/0159978 A1    Jun. 9, 2016

Related U.S. Application Data

(63) Continuation of application No. 13/497,267, filed as application No. PCT/US2010/049567 on Sep. 21, 2010.

(60) Provisional application No. 61/246,654, filed on Sep. 29, 2009.

(51) Int. Cl.
| | | |
|---|---|---|
| F26B 3/00 | (2006.01) |
| C08G 65/30 | (2006.01) |
| B01D 3/14 | (2006.01) |
| B01D 3/26 | (2006.01) |
| B01D 3/34 | (2006.01) |
| B01D 3/38 | (2006.01) |

(52) U.S. Cl.
CPC ............. C08G 65/30 (2013.01); B01D 3/143 (2013.01); B01D 3/26 (2013.01); B01D 3/343 (2013.01); B01D 3/38 (2013.01)

(58) Field of Classification Search
CPC ............. F26B 7/00; F26B 17/003; B01D 3/00
USPC .......... 34/505, 506, 507, 509; 202/158, 205; 203/17, 96
See application file for complete search history.

(56) References Cited

U.S. PATENT DOCUMENTS

| | | | |
|---|---|---|---|
| 3,322,667 A | 5/1967 | Lawson | |
| 4,802,975 A | 2/1989 | Mehlberg | |
| 5,141,630 A | 8/1992 | Grosboll | |
| 6,504,062 B2 | 1/2003 | Brons | |
| 2007/0000487 A1* | 1/2007 | Sakata | ............... H01L 51/5088 126/561 |
| 2007/0083001 A1* | 4/2007 | Amrhein | ................... C08F 6/20 524/567 |

(Continued)

Primary Examiner — Kenneth Rinehart
Assistant Examiner — John McCormack
(74) Attorney, Agent, or Firm — Gary C Cohn PLLC

(57) ABSTRACT

Organic materials are stripped and dried in a single column having two contact zones. A stripping gas is introduced into an upper contact zone and flows through the organic material in that zone. A drying gas is introduced into a lower contact zone. The drying gas contacts the organic material in both the upper and lower contact zones, and is removed from the top of the column together with the stripping gas. This process permits very efficiently removal of volatile organic compounds as well as efficient drying, while requiring on low levels of the stripping and drying gasses.

4 Claims, 1 Drawing Sheet

(56) References Cited

U.S. PATENT DOCUMENTS

2008/0033139 A1* 2/2008 Brockelt .............. C08G 18/632
528/85

* cited by examiner

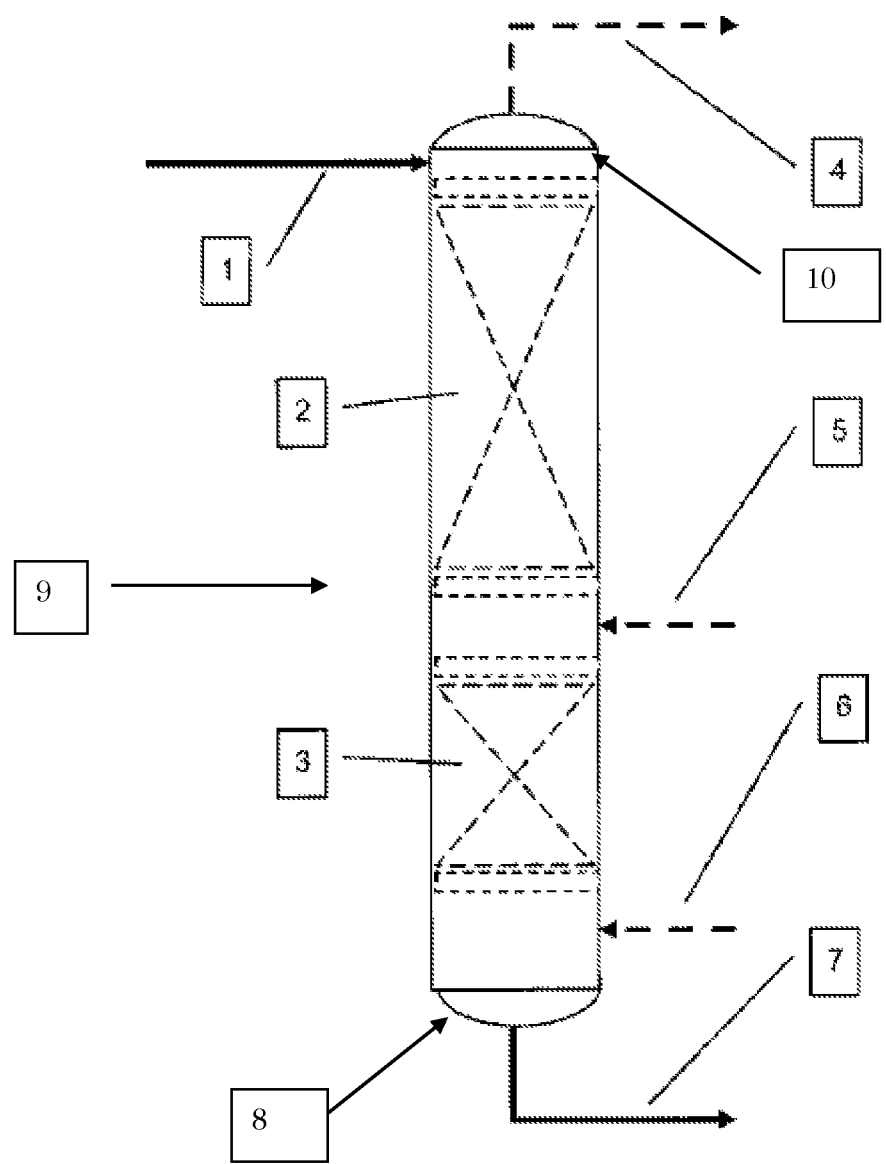

SINGLE COLUMN STRIPPING AND DRYING PROCESS

The present invention relates to a process for stripping impurities from organic compounds and organic polymers such as poly(alkylene oxide) polymers.

Many organic compounds and polymers are manufactured using processes that leave them with some level of impurities and/or moisture. It is often necessary to remove those impurities and that moisture to very low levels, so that the product is suitable for use in some downstream operation. There are many instances of this in the chemical industry. One prominent example is in manufacturing poly(alkylene oxide) polymers; the crude polyols often contain significant amounts of volatile aldehyde impurities which, among other things, impart a noxious odor to the polyols and to products such as polyurethane foam that are made from the polyols. In addition, the polyether polyols often contain up to 5% or so by weight of water, which needs to be reduced to much lower levels before the polyols can be used in polyurethane manufacturing. A related manufacturing process is the production of so-called polymer polyols by the polymerization of monomers such as styrene and/or acrylonitrile in the presence of a poly(alkylene oxide) polyol. The polymer polyol products generally contain significant quantities of volatile organic impurities, especially unreacted monomers, which need to be removed from the product before it can be used.

Stripping methods are commonly used to remove volatile impurities from organic compounds to very low levels. One common approach to stripping is to pass the organic compound downwardly through a stripping column, which is often operated at subatmospheric pressures. A stripping gas, usually steam, is passed upwardly through the column, countercurrent to the organic compound, and carries volatile organic impurities with it out of the top of the column.

Stripping processes for removing volatile impurities from polyether polyols are described, for example, in U.S. Pat. No. 6,060,627 and US Published Patent Application Nos. 2008/0033139 and 2008/0033214. In U.S. Pat. No. 6,060,627, a propoxylated glycerin containing water, allyl alcohol and propylene glycol allyl ethers is sent to a reboiler evaporator to remove the bulk of the water, and then vacuum stripped with steam as the stripping gas. The weight ratio of steam to polyether polyol mixture being treated is about 0.0287:1. In US 2008/0033139, a two-column stripping apparatus is described for stripping residual monomers from a polymer polyol product. The working examples of that application describe very high steam to polyol ratios (0.2:1 by weight). These high levels of steam are described as reducing the levels of residual monomer and isopropanol from around 12,000 to 13,000 ppm to as low as 1 ppm each, but more typical results are in the range of 10 to 20 parts per million. In addition, a specific impurity, a "recombination product" remains in the polyol at the level of hundreds of parts per million, and water content is not reduced or is even increased.

US 2008/0033214 describes a stripping process for polyether polyols which, prior to treatment, are said to have at most 100 parts per million volatile organic compounds. The stripping process removes these only to the 20 ppm level, which is said to be enough to reduce odor but is nonetheless a significant loading. The weight ratio of stripping gas to polyol is said to be from 0.01 to 0.05. The example describes stripping using nitrogen as a stripping agent.

Drying also can be performed in a column, by passing a drying gas through the column countercurrent to the flow of the organic material.

It is desirable to develop a stripping and drying process which effectively removes volatile organic impurities to very low levels, such as 10 ppm or below, and which also removes water to low levels, such as to 200 ppm or below, and which does so efficiently and inexpensively.

This invention is such a process. This invention is a process for stripping and drying a starting organic material, comprising:

a) introducing the starting organic material into an upper contact zone of a column that has an upper contact zone and a lower contact zone, and allowing the starting organic material to travel downwardly through the column, through the upper contact zone and then through the lower contact zone to a bottom section of the column;

b) introducing a stripping gas into the upper contact zone of the column and above the lower contact zone of the column such that the stripping gas moves upwardly through the upper contact zone, where it contacts the starting organic material and removes impurities therefrom, and then to a top section of the column;

c) introducing a drying gas into the lower contact zone of the column such that the drying gas moves upwardly through the lower contact zone where it contacts a portion of the organic material and removes moisture from therefrom, then moves upwardly through the upper contact zone where it contacts another portion of organic material, and then moves to a top section of the column;

d) removing the stripping gas and the drying gas from the top section of the column above the upper contact zone; and e) removing the stripped and dried organic material from the bottom section of the column below the lower contact zone.

The stripping process of this invention offers several potential advantages over previous approaches in which the stripping and drying steps are conducted separately. Costs for equipment are lower, because the stripping and drying are conducted in a single column instead of multiple columns. Volatile organic impurities often can be reduced to very low levels using surprisingly small amounts of stripping gas. This results in reduced costs for those materials and fewer costs associated with handling the larger volumes of gases. When the stripping gas is steam, as is preferred, the invention also offers advantages in energy costs (because less steam needs to be produced) and in wastewater treatment costs (for example, to dispose of condensed steam and volatile organic compounds entrained therein). Because the drying gas passes through the upper contact zone and contacts the organic material there, it contributes to the stripping that occurs in the upper contact zone and thus reduces the amount of stripping gas that is needed. This reduces the size and cost of the vacuum system required to operate the column at reduced pressure.

The process is well-adapted for continuous operation, which again reduces costs and eliminates in some cases the need for storing the organic material prior to the stripping and drying process. Eliminating or reducing the storage of the material can in some instances, as in the case when the organic material is a polyether, reduce or eliminate the need to add stabilizers such as antioxidants, or to make pH adjustments to the material, or to conduct other pretreatments of the material.

The FIGURE is a schematic drawing of the process of the invention.

Turning to the FIGURE, stripping column 9 includes liquid inlet 1, through which the starting organic polymer or compound containing volatile organic impurities is introduced into column 9. The starting organic material, upon entering column 9, flows downwardly through upper contact zone 2 of column 9. Stripping gas is introduced into upper contact zone 2 column 9 through stripping gas inlet 5. Stripping gas inlet 5 is below liquid inlet 1, where the starting organic material is introduced into the column, and above lower contact zone 3. Generally, the location of stripping gas inlet 5 will demark the division between upper contact zone 2 and lower contact zone 3 of column 9.

Stripping gas introduced into column 9 via gas inlet 5 travels upwardly, passing through upper contact zone 2 where it contacts starting organic compound or polymer and at least partially strips volatile (relative to the organic material) impurities from organic material. The stripping gas with entrained impurities then passes upwardly to top section 10 of column 9, where it exits column 9 through gas outlet 4. Top section 10 is generally the portion of column 9 above liquid inlet 1, where the gasses can accumulate to be removed from column 9 through gas outlet 4.

The organic material, having passed downwardly through upper contact zone 2, then enters lower contact zone 3 of column 9. A drying gas is introduced via drying gas inlet 6 into lower contact zone 3, where it contacts the organic material and removes moisture therefrom. Generally, the location of drying gas inlet 6 will demark the division between lower contact zone 3 and bottom section 8 of column 9. The dried organic material then flows to a bottom section 8 of column 9 where it collects below drying gas inlet 6 and from where it is removed from column 9 via outlet 7. After passing through lower contact zone 3, the drying gas passes upwardly through column 9 into upper contact zone 2, where it contacts more of the organic material at the same time as the organic material contacts the stripping gas. The drying gas is believed to contribute to the stripping operation that occurs in upper contact zone 2. The drying gas then passes into top section 10 and is removed together with the stripping gas through gas outlet 4.

Apart from having the specific features described above (i.e., the various inlets and outlets and upper and lower contact zones), stripping column 9 does not need to have any special construction or design. It may be constructed of any suitable material, taking into account the operating conditions (mainly temperature and pressure), the particular organic material, the particular stripping gas and the particular drying gas. Various grades of steel or aluminum are generally suitable.

Stripping column 9 will generally contain a packing in at least upper contact zone 2 and lower contact zone 3. The packing serves the purposes of distributing the organic material more uniformly across the cross-section of the column, increasing the residence time of the organic material within the column, increasing the surface area of the organic material to facilitate better contact with the stripping and drying gases, and of facilitating heat transfer if needed. A wide variety of porous materials are suitable as the packing, including meshes, wools, fibers, a series of porous plates, beads or other particulates, various types of structured packings, trays and the like. As before, the material of construction is not considered to be critical and will be selected taking the operating conditions and the particular organic material, stripping gas and drying gas into account. Metal and ceramic packings are generally preferred. If metal packings are used, the metal should be resistant to chemical attack from water and/or other chemical species.

Stripping column 9 may also contain one or more supports for holding the packing material in place within the column.

The packing in stripping column 9 may have a specific surface area of from 150 to 500 $m^2$ per cubic meter. A preferred specific surface area is from 230 to 450 $m^2/m^3$.

Stripping column 9 may have a jacket for applying a heating or cooling medium such as steam to the outside of the column to provide for temperature control. Other heating and cooling devices may be present in addition to or in place of such a jacket.

Stripping column 9 will also generally contain means for distributing the stripping gas supplied by stripping gas inlet 5 across the cross-section of the column. Therefore, stripping gas inlet 5 will generally be in fluid communication with a stripping gas distribution means, through which stripping gas is received from stripping gas inlet 5 and introduced into stripping column 9. The stripping gas distribution means preferably introduces the stripping gas into column 9 at multiple locations across its cross-section. The stripping gas distribution means may include, for example, one or more distribution plates, spargers, bubbles, jets, nozzles or similar apparatus.

Similarly, drying gas inlet 6 will also generally be in fluid communication with means for distributing the drying gas across the cross-section of stripping column 9. Suitable designs for such drying gas distribution means include those mentioned above with regard to the stripping gas distribution means.

Stripping column 9 may contain means for distributing the organic material introduced through inlet 1 across the cross-section of the column. Again, specific apparatus as are mentioned above with regard to the stripping gas distribution means are entirely suitable.

Gas outlet 4 is preferably in fluid communication with a gas removal means for withdrawing the stripping and drying gases from column 9, and, if column 9 is to be operated under subatmospheric pressure, for pulling a vacuum onto column 9. The gas removal means may be of any suitable design. Mechanical devices such as simple fans or blowers and vacuum pumps of various designs are suitable. If the stripping gas is steam or other easily condensable gas, the gas removal means may consist of or include one or more condensers, which condense some or all of the removed gas and thereby produce a vacuum in the system. Combinations of these approaches can be used.

Outlet 7 also is preferably in fluid communication with a pumping means for withdrawing the stripped and dried organic material from the column. The pumping means is any sort of device for moving a liquid through a conduit. Various types of pumps and impellers are suitable. The design of the pumping means is not considered to be critical to the invention.

The organic material is any organic compound or mixture of organic compounds, which is a liquid under the conditions at which the stripping column is operated. A mixture of organic compounds may include a solution of one material in a solvent, which solvent may be a process solvent from some upstream step, or one which is used to dissolve or reduce the viscosity of another organic material for processing through the stripping column. The organic material, prior to treatment according to this invention, will generally contain one or more impurities which are more volatile than the organic material (and more volatile than any solvent which is needed to maintain the organic material as a liquid through the stripping and drying process) and which can be removed by stripping. The organic material may contain moisture, i.e., some small amount of water, prior to being introduced into stripping column 9. This is the usual case when the stripping gas is something other than steam. When steam is used as the stripping gas, the organic material will usually absorb some moisture from the steam in upper contact zone 2, which moisture is then removed through contact with the drying gas in lower contact zone 3.

The organic material may include or consist of (apart from impurities and moisture) one or more organic polymers, which may or may not be dissolved in some solvent.

The starting organic material may contain, for example, from 10 to 20,000 parts per million by weight (ppm) of volatile organic impurities. Greater levels of organic impurities are difficult to remove to very low levels in a stripping process. A preferred level of volatile organic impurities in the starting organic material is from 50 to 5,000 ppm and a more preferred level is from 50 to 2,000 ppm. The starting organic material may contain up to 50,000 ppm of water, up to 10,000 ppm water, up to 5,000 ppm of water, or up to 2,500 ppm of water.

A preferred organic material is a crude liquid polyether having a molecular weight of from about 500 to 10,000, which is the product of an alkylene oxide polymerization reaction. The alkylene oxide may be, for example, ethylene oxide, propylene oxide, butylenes oxide, 1,2-hexane oxide, tetrabutylene oxide, styrene oxide, or a mixture of any two or more thereof. These oxides can be polymerized in an anionic polymerization process in the presence of an initiator compound and of an alkali metal hydroxide catalyst. Alternatively, the oxides can be polymerized, again in the presence of an initiator compound, using a double metal cyanide catalyst complex. The crude liquid polyether will generally be terminated in hydroxyl groups, and may have, for example, from 1 to 12 hydroxyl groups per molecule. Crude liquid polyethers manufactured in these ways typically contain a number of organic impurities, including unreacted oxides, various aldehyde by-products and the like, which are more volatile than the liquid polyether and are susceptible to being removed in a stripping process. Polyethers made using an anionic polymerization process are often in addition treated to neutralize and remove the catalyst residues and for that reason often contain some amount of entrained moisture.

Another preferred organic material is a crude polymer polyol which is obtained from a process in which one or more ethylenically unsaturated monomers are polymerized in the presence of a polyether polyol. Such crude polymer polyol products tend to contain up to 20,000 ppm, preferably up to 10,000 ppm of unreacted monomers, chain transfer agents, free radical initiators and/or decomposition residues of these.

The stripping gas is selected such that, under the conditions used in the stripping column, it exists in the gas phase and does not react with the organic material. The stripping gas also preferably has low solubility in the organic material. A preferred stripping gas is easily condensable, as this allows a vacuum to be pulled in the stripping column by condensing the stripping gas that has been removed from the column. Superheated steam is an especially preferred stripping gas. By "superheated" it is meant that the steam is at a temperature above its dew point under the conditions at which the column is operated. Mixtures of gases can be used, such as, for example, a mixture of superheated steam and air, or of superheated steam and an inert gas such as nitrogen or argon. The amount of stripping gas may range from 0.0002 to 0.1 kg or more of stripping gas per kg of organic material. A preferred amount is from 0.0002 to 0.03 kg per kg of organic material and a more preferred amount is from 0.0002 to 0.02 kg per kg of organic material.

The drying gas is also selected such that, under the conditions used in the stripping column, it exists in the gas phase and does not react with the organic material, and also preferably has low solubility in the organic material. The drying gas should contain no more than 100, preferably no more than 50 ppm of water. Dry air is a useful stripping gas, but inert gasses such as argon and especially nitrogen are preferred. The amount of drying gas may range from 0.0001 to 0.1 kg of organic material. A preferred amount is from 0.0001 to 0.003 kg per kg of organic material.

The temperature and pressure conditions at which the stripping and drying process is performed will of course depend on the particular organic material, the nature of the organic impurities and the particular stripping and drying gases that are used. The temperature and pressure in the stripping column are such that the organic material (apart from volatile organic impurities that are to be removed) remains in the liquid state as it passes through the column, and such that the stripping and drying gases remain in the gaseous state as they pass up through the column. Subatmospheric pressures are preferred, to facilitate removal of the volatile organic impurities and water from the organic material. The pressure inside the stripping column may be, for example, from 5 to 100 mbar or from 15 to 50 mbar. A suitable temperature may be from 0 to 160° C. A preferred temperature, especially for stripping polyethers, is from 90 to 150° C., and a more preferred temperature is from 120 to 140° C.

It is generally desirable to reduce the amount of organic impurities and moisture in the treated organic material to very low levels, such as, for example, to 10 ppm or below in the case of organic impurities and to 200 ppm or below in the case of residual moisture. It is more preferred to reduce the level of the volatile organic impurities to 1 ppm or below.

The following examples are provided to illustrate the invention, but not to limit the scope thereof. All parts and percentages are by weight unless otherwise indicated.

EXAMPLE 1

A single stripping column designed as shown in FIG. 1 is constructed. A crude polyol containing 6,000 ppm water and 1,000 ppm volatile organic impurities is passed through the column at 130° C. The column is operated at 15 mbar. The stripping gas is superheated steam, and the drying gas is nitrogen. Only 0.005 kg of steam per kg of crude polyol is needed to reduce the amount of volatile organic impurities to 0.5 ppm. The amount of nitrogen drying gas is only 0.0004 kg per kg of crude polyol; this amount is sufficient to reduce the water content to 100 ppm. Therefore, with this invention, not only is steam consumption very low but the total amount of stripping plus drying gas is also very low and the water content is reduced dramatically in addition to the near-complete removal of volatile organic compounds.

What is claimed is:

1. A process for stripping and drying a starting organic material, comprising:
    a) introducing the starting organic material into an upper contact zone of a column that has an upper contact zone and a lower contact zone, and allowing the starting organic material to travel downwardly through the column, through the upper contact zone and then through the lower contact zone to a bottom section of the column;

b) introducing 0.0002 to 0.02 kg of superheated steam per kg of starting organic material into the upper contact zone of the column and above the lower contact zone of the column such that the superheated steam moves upwardly through the upper contact zone, where it contacts the starting organic material and removes impurities therefrom, and then to a top section of the column;

c) introducing 0.0001 to 0.003 kg of nitrogen or argon per kg of starting organic material into the lower contact zone of the column such that the nitrogen or argon moves upwardly through the lower contact zone where it contacts a portion of the organic material and removes moisture therefrom, then moves upwardly through the upper contact zone where it contacts another portion of organic material, and then moves to a top section of the column;

d) removing the steam and the nitrogen or argon from the top section of the column above the upper contact zone; and e) removing the stripped and dried organic material from the bottom section of the column below the lower contact zone, wherein the starting organic material is a liquid polyether having a molecular weight of from 500 to 10,000 or crude polymer polyol, the starting organic material contains from 50 to 5,000 ppm of volatile organic impurities and up to 50,000 ppm of water, and the stripped and dried organic material contains up to 10 ppm of volatile organic compounds and up to 200 ppm of water.

2. The process of claim 1 wherein the nitrogen or argon contains no more than 50 ppm moisture.

3. The process of claim 2, wherein the column is operated at a pressure of from 5 to 100 mbar.

4. The process of claim 3, wherein the column is operated at a temperature of from 90 to 150° C.

* * * * *